Patented Sept. 9, 1952

2,610,190

UNITED STATES PATENT OFFICE 2,610,190

PREPARATION OF BENZOTHIAZOLE THROUGH PYROLYSIS

Tsai Hsiang Chao and Edward Martin Wharton, Bound Brook, N. J., assignors to American Cyanamid Company, New York, N. Y., a corporation of Maine No Drawing. Application March 12, 1949, Serial No. 81,214

4 Claims. (Cl. 260—304)

This invention is concerned with the preparation of benzothiazole. More particularly, the invention is concerned with the preparation of benzothiazole by pyrolysis of a compound containing the benzothiazole nucleus. Still more specifically, the invention is particularly concerned with compounds containing the mercaptobenzothiazole nucleus, which by pyrolysis are converted to benzothiazole.

Benzothiazole has become of increasing commercial importance for use both as a corrosion inhibitor and as an intermediate in the preparation of various dyestuffs and plasticizers. Its use has been, unfortunately, limited by the restrictions on previously available methods of preparation. Commercially, this compound has been prepared in the past by a series of cyclization reactions, starting from orthoaminothiophenol. The latter is not a readily available material and is, in fact, most conveniently prepared from benzothiazole derivatives by ring-opening reactions. It is readily apparent why such indirect processes of preparation have limited the availability and usefulness of benzothiazole.

It is, therefore, the principal object of the present invention to devise a method whereby benzothiazole can be simply and readily prepared. Preferably, it should be a process utilizing readily available starting materials, should require no unusual apparatus and should be capable of directly yielding the desired product by simple, readily controlled operations.

Surprisingly, in view of previous experience, these objects of the present invention have been fully and easily met. In general, the process comprises a straight forward pyrolysis of a compound containing the benzothiazole nucleus, such as a mercaptobenzothiazole. Pyrolysis, in the range of about 200°-350° C., proceeds readily to give substantial yields of the product. By the present invention, therefore, benzothiazole is thus made much more readily accessible than it has been in the past. Since mercaptobenzothiazoles are important industrially, are prepared in large quantities, and work well in the present process, they constitute readily-available and probably the preferable starting materials.

In general, the practice of the present invention is quite simple. Source material is charged into a suitable vessel, preferably connected with a condenser and receiver, and is heated. Pyrolysis usually begins between about 200°-275° C., and proceeds at temperatures up to about 350° C. Benzothiazole is distilled out and condensed during the course of the reaction, the temperature gradually increasing until reaction appears to be substantially complete. Some hydrogen sulfide and carbon disulfide will ordinarily be found in the condensate. These latter, however, are readily separated from the condensate either by re-distillation or by washing. For many commercial purposes, such purification is unnecessary.

The procedure works very well, using as starting materials 2-mercaptobenzothiazole or its oxidation product, 2,2'-dibenzothiazolyl disulfide, or a heavy metal salt such as the zinc, copper and lead salts. The most noticeable distinction is found in the temperature at which reaction begins. With 2-mercaptobenzothiazole, reaction begins at about 200° C. or slightly above. In the case of the oxidized product, 2,2'-dibenzthiazolyl disulfide, somewhat higher temperatures, about 275° C., are usually required to institute reaction.

While these reactions are entirely satisfactory, it is possible to still further improve the method by using with the starting material a heavy metal. It is not clear whether this effect is a direct catalysis of the decomposition reaction, whether it operates by the removal of sulfur-containing by-products, or whether the improvement is attributable to some other cause.

In any case, the presence of the heavy metal definitely creates a smoother reaction and results in higher yields. Iron is a particularly suitable material. It causes a definite increase in the yield of the product. While other heavy metals may be used, iron, because of its availability and excellent properties, is a very useful and probably the preferable material. About 25-50% by weight of the mercaptobenzothiazole is usually found to be a suitable amount. The advantage of adding the heavy metal is obtained whether the starting material is mercaptobenzothiazole or a metal salt thereof or the corresponding disulfide.

The process of the present invention will be more fully illustrated in conjunction with the following examples. The latter are intended as illustrative only and not by way of limitation. Except as otherwise noted, all parts are by weight.

Example 1

A suitable still is equipped with a direct condenser and receiver. Into the still is charged a crude 2-mercaptobenzothiazole, about 90% pure. Heat is applied and the temperature gradually increased. Pyrolysis begins at about 215° C. as evidenced by evolution of hydrogen sulfide and carbon disulfide. Heating is continued and benzothiazole begins to distill when the temperature reaches 255° C. Most of the product is obtained before the temperature reaches 315° C. At 325° C. heating is discontinued. The product condensate is substantially freed from small amounts of hydrogen sulfide and carbon disulfide by redistillation.

*Example 2*

In the process of Example 1 the 2-mercaptobenzothiazole is replaced by its oxidation product, 2,2'-dibenzthiazolyl disulfide. Distillation of benzothiazole begins at about 275° C. Heating is discontinued at about 345° C. The hydrogen sulfide and carbon disulfide in the condensate is reduced by redistillation.

*Example 3*

Again the procedure of Example 1 is repeated, substituting for 2-mercaptobenzothiazole the zinc salt thereof. Substantially the same results are obtained as in Example 1.

*Example 4*

Again the procedure of Example 1 is repeated. However, powdered iron, approximately ½ by weight of the mercaptobenzothiazole, is admixed with the still charge. As shown by the volume collected in the receiver, an increased yield is obtained.

We claim:

1. The process of preparing benzothiazole which comprises the steps of subjecting a member of the group consisting of 2-mercaptobenzothiazole of the formula

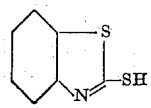

its heavy metal salts and the corresponding disulfide to a temperature of from 200°–350° C., in the presence of powdered metallic iron of at least about 25% by weight of the mercaptobenzothiazole, the temperature being sufficiently high to cause distillation, continuing the distillation until it substantially ceases, and collecting the distillate.

2. A process according to claim 1 in which the mercaptobenzothiazole is 2 - mercaptobenzothiazole.

3. A process according to claim 1 in which the material subjected to distillation is the zinc salt of 2-mercaptobenzothiazole.

4. A process according to claim 1 in which the mercaptobenzothiazole is dibenzthiazolyl disulfide.

TSAI HSIANG CHAO.
EDWARD MARTIN WHARTON.

REFERENCES CITED

The following references are of record in the file of this patent:

UNITED STATES PATENTS

| Number | Name | Date |
|---|---|---|
| 2,263,014 | Scott | Nov. 18, 1941 |

OTHER REFERENCES

Hurd: "The Pyrolysis of Carbon Compounds." The Chemical Catalog Co. (New York), pp. 9–10, 1929.

Bloomquist et al.: "Jr. Organic Chem.," vol. 12, pp. 718–724, Sept. 1947.